US009208680B2

(12) United States Patent
Norlén et al.

(10) Patent No.: US 9,208,680 B2
(45) Date of Patent: Dec. 8, 2015

(54) REMOTE COMMISSIONING OF AN ARRAY OF NETWORKED DEVICES

(71) Applicant: Lumen Radio AB, Göteborg (SE)

(72) Inventors: Niclas Norlén, Uddevalla (SE); Michael Karlsson, Kode (SE); Marcus Bengtsson, Göteborg (SE)

(73) Assignee: LUMEN RADIO AB, Gothenburg (SE)

(*) Notice: Subject to any disclaimer, the term of this patent is extended or adjusted under 35 U.S.C. 154(b) by 115 days.

(21) Appl. No.: 13/740,082

(22) Filed: Jan. 11, 2013

(65) Prior Publication Data

US 2013/0181813 A1 Jul. 18, 2013

Related U.S. Application Data

(60) Provisional application No. 61/585,864, filed on Jan. 12, 2012.

(51) Int. Cl.

*H02J 13/00* (2006.01)
*G08C 19/16* (2006.01)
*G08C 17/02* (2006.01)
*H05B 37/02* (2006.01)

(52) U.S. Cl.

CPC ................ *G08C 19/16* (2013.01); *G08C 17/02* (2013.01); *H05B 37/0272* (2013.01); *G08C 2201/20* (2013.01); *G08C 2201/71* (2013.01); *G08C 2201/91* (2013.01)

(58) Field of Classification Search

CPC ......... H04Q 9/14; H04L 12/403; G08C 15/12
USPC ........... 340/9.1, 12.22, 5.64, 3.1; 315/368.12; 700/276
See application file for complete search history.

(56) References Cited

U.S. PATENT DOCUMENTS

| | | | | |
|---|---|---|---|---|
| 7,391,297 | B2 * | 6/2008 | Cash et al. | 340/3.5 |
| 7,446,671 | B2 | 11/2008 | Giannopoulos et al. | |
| 7,755,505 | B2 | 7/2010 | Johnson et al. | |
| 8,049,592 | B2 | 11/2011 | Wang et al. | |
| 8,082,065 | B2 * | 12/2011 | Imes et al. | 700/276 |
| 2002/0089722 | A1 * | 7/2002 | Perkins et al. | 359/155 |
| 2003/0197625 | A1 | 10/2003 | Szuba | |
| 2004/0160199 | A1 | 8/2004 | Morgan et al. | |
| 2006/0125426 | A1 * | 6/2006 | Veskovic et al. | 315/312 |

(Continued)

FOREIGN PATENT DOCUMENTS

| | | | |
|---|---|---|---|
| WO | 2011121470 | A1 | 10/2011 |
| WO | 2013105068 | A1 | 7/2013 |

*Primary Examiner* — Vernal Brown

(74) *Attorney, Agent, or Firm* — Patent Law Offices Michael E. Woods; Michael E. Woods

(57) ABSTRACT

A system and method for identification of a particular one device from an array of networked devices. Each of the devices are individually addressable by a controller on the network, and a technician preferably identifies a particular one device by use of a handheld remote control. Pointing one of transmitter/receiver pair at a device including the complementary component allows remote disambiguation based upon ranging and signal strength, particularly when using a pair of orthogonal antennas to discriminate and confirm which particular device is being pointed to by the remote. Optional confirmation helps improve identification robustness, and then the properly identified device may be configured/commissioned.

22 Claims, 4 Drawing Sheets

(56) References Cited

U.S. PATENT DOCUMENTS

| | | | |
|---|---|---|---|
| 2006/0208661 | A1 | 9/2006 | Mogilner et al. |
| 2008/0218334 | A1 | 9/2008 | Pitchers et al. |
| 2008/0315798 | A1 | 12/2008 | Diederiks et al. |
| 2009/0121842 | A1 | 5/2009 | Elberbaum |
| 2010/0007514 | A1 | 1/2010 | Sejkora |
| 2010/0231131 | A1 | 9/2010 | Anderson |
| 2011/0006877 | A1 | 1/2011 | Franklin |
| 2011/0276193 | A1 | 11/2011 | Bowman et al. |
| 2011/0302282 | A1 | 12/2011 | Dadlani Mahtani et al. |

* cited by examiner

REMOTE COMMISSIONING OF AN ARRAY OF NETWORKED DEVICES

CROSS REFERENCE TO RELATED APPLICATIONS

This application claims benefit of U.S. Application No. 61/585,864 filed 12 Jan. 2012, the contents of which are expressly incorporated in its entirety by reference thereto.

BACKGROUND OF THE INVENTION

The present invention relates generally to configuration and commissioning of an array of networked devices, and more specifically, but not exclusively, to configuration and set up of a lighting control system.

It is common to have an installation of an array of networked devices that offer a physical impediment or other constraint to a technician desiring to physically access individual ones of these devices. Lights of a lighting installation controlled by a lighting control system are representative of this scenario. The lighting installation includes many lighting fixtures that appear exactly the same, and they are often installed in multiple locations, each location requiring a ladder or the like to access.

A problem is that many commissioning procedures require that the technician physically access each device to verify its location and connection to the control system. In some cases, the device is preconfigured (by the manufacturer and/or by the technician prior to installation) with an address, and that address is mapped to a physical location, with the nominal physical address and address entered into the control system. However, it is easy to misconfigure the address and/or install the device at an incorrect location. Configuration and setup can thereafter be difficult, especially attempts to identify and correct the misconfiguration. The constraint interferes and delays the efforts to identify and correct the misconfiguration.

In other cases, each device has a configuration mode that may be actuated manually by physically accessing the device. The constraint interferes and delays the physical access to each device, and thereby interferes and delays the entire configuration and setup of the entire system.

In still other cases, the technician has a control device that causes the controller to sequentially and slowly step through all available addresses until a specific individual device is identified. Different types of devices reveal their specific actuation differently. With a lighting system, the specific addresses lighting fixture is able to dim the light level up and down and/or flash the light in a particular pattern.

For all these cases, the identification process in which the technician confirms that she is configuring the correct device, the procedure easily becomes very time consuming as the size of the installation increases. What is needed is a system and method for identification of a particular one device from an array of networked devices.

BRIEF SUMMARY OF THE INVENTION

Disclosed is a system and method for identification of a particular one device from an array of networked devices. Each of the devices is individually addressable by a controller on the network, and a technician preferably identifies a particular one device by use of a handheld remote control.

The following summary of the invention is provided to facilitate an understanding of some of technical features related to identification of a particular light fixture in a lighting installation controlled by a lighting controller, and is not intended to be a full description of the present invention. A full appreciation of the various aspects of the invention can be gained by taking the entire specification, claims, drawings, and abstract as a whole. The present invention is applicable to other devices other than light fixtures and to other installations other than lighting installations.

A method for identifying a particular one network lighting device from a network including a plurality of network lighting devices, each network lighting device including a unique associated network ID used in addressing the network lighting device over the network, comprising: a) exchanging wirelessly a plurality of disambiguation data between a portable configurator and a set of network lighting devices from the plurality of network lighting devices in communication range of the portable configurator, the set of network lighting devices including the particular one network lighting device; and b) determining automatically using the portable configurator a map of the set of network lighting devices, the map identifying, for each network lighting device of the set of network lighting devices, both a distance between the portable configurator and the unique associated network ID.

An apparatus, comprising: a network having a plurality of network lighting devices, each particular network lighting device including a processor, a memory storing program instructions executable by the processor, a network interface coupled to one or more other network interfaces of other network lighting devices, and a network ID, the stored network ID associated with the particular network lighting device and configured to uniquely address the particular network lighting device over the network, and each particular network lighting device further including a wireless communicator coupled to the processor; a network controller communicated to the plurality of network lighting devices using the network, the network controller issuing a command to a particular one network lighting device using the network ID associated with the particular one network lighting device; and a portable configurator including a stored program processor, a memory storing non-transitory program instructions for the stored program processor, and a wireless configurator communication device in communication with the wireless communicators of a set of network lighting devices of the plurality of network lighting devices including the particular one network lighting device, each the network lighting device of the set of network lighting devices having a relative physical location with respect to the portable configurator, the portable configurator, responsive to execution of the non-transitory program instructions by the stored program processor, exchanges a first plurality of wireless disambiguation data with the set of network lighting devices and establishes a physical location map that associates each network lighting device of the set of network lighting devices with both a relative physical location and its the associated network ID.

A method for identifying a particular one network lighting device from a network including a plurality of network lighting devices, each network lighting device including a unique associated network ID used in addressing the network lighting device over the network, comprising: a) initiating a coarse identification process for the particular one network lighting device using a portable configurator that exchanges a first set of disambiguation data with a set of the plurality of network lighting devices, the set including the particular one network lighting device; and thereafter b) processing automatically the first set of disambiguation data to create a map of the set of network lighting devices, the map identifying, for each network lighting device of the set of network lighting devices, both a distance between the portable configurator and the unique associated network ID.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates a first representative arrangement of a receiver within a radiation pattern of a transmitter;

FIG. 3 illustrates a second representative arrangement of a receiver within a radiation pattern of a transmitter;

FIG. 4 illustrates a third representative arrangement of a receiver within a radiation pattern of a transmitter;

DETAILED DESCRIPTION OF THE INVENTION

Embodiments of the present invention provide a system and method for identification of a particular one device from an array of networked devices. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
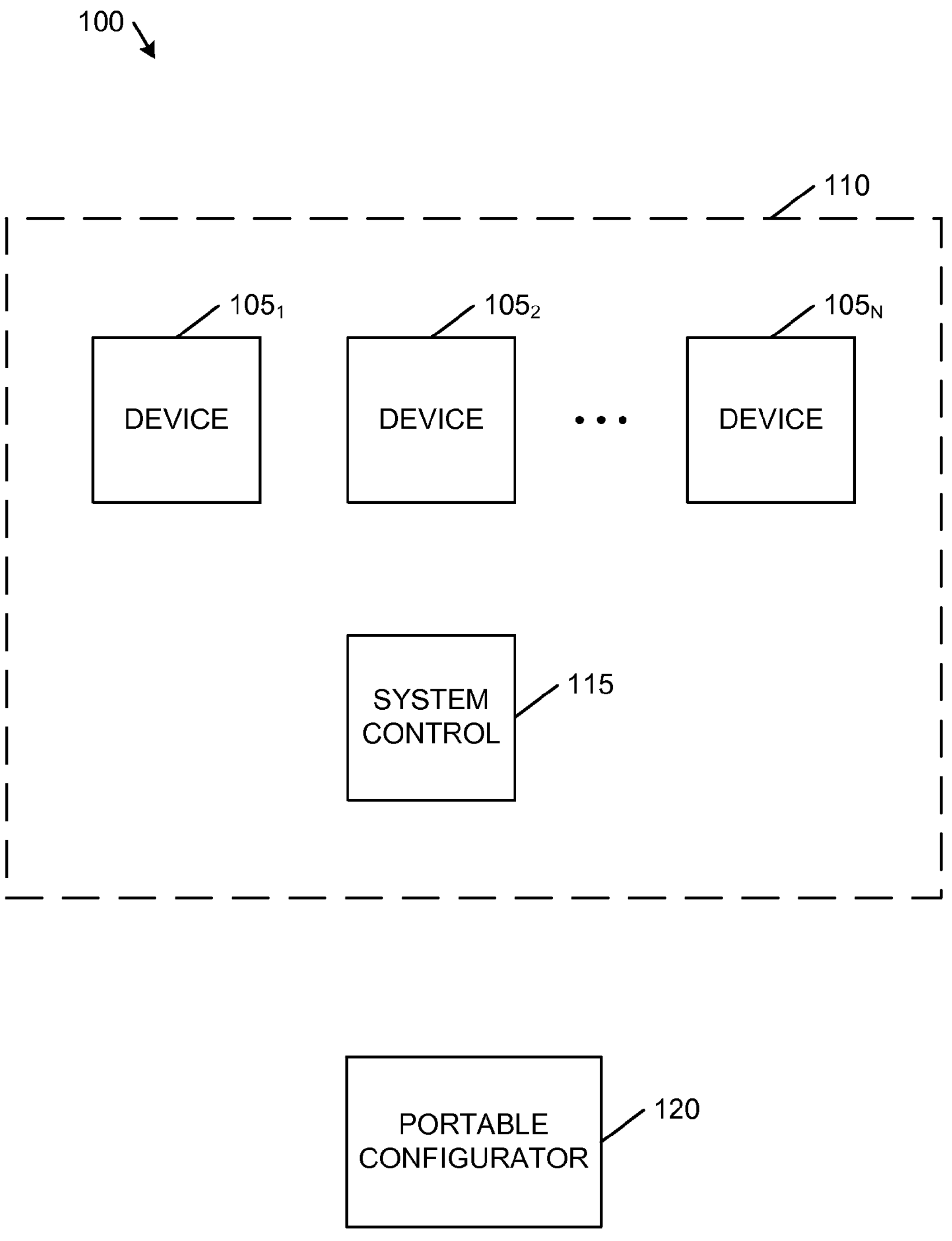
FIG. 1 illustrates an installation including an array of devices to be commissioned into a network operated by a system controller.

FIG. 1 illustrates an installation 100 including an array of devices $\mathbf{105}_i$, i=1 to N, to be commissioned into a network 110 operated by a system controller 115. A portable configurator 120 communicates with devices 105 and system controller 115 to identify a particular one device $\mathbf{105}_x$, enabling a technician to efficiently and simply unambiguously commission device $\mathbf{105}_x$.

Devices 105 generally represent a class of intelligent devices that are addressable (individually or in groups/subsets) under direction from system controller 115 over network 110. Before this can be done, each device is individually identified and commissioned. The larger the number N, the more involved the identification and commissioning process, and the more constraint that there is when initiating the commissioning process for a particular one device $\mathbf{105}_x$, the more advantageous are the embodiments of the present invention. Installation 100 is not limited to lighting installations and devices 105 are not limited to lighting fixtures as the problems associated with identification and commissioning of arrays of intelligent devices exist in many situations. It is also the case that network 110 may be implemented using a wide-range of communication and network protocols.

System controller 115 accesses each device 105, such as by a unique network ID or address, to implement one or more actions under appropriate control, which may be automatic, semi-automatic, or manual. Each device 105 is located, identified, and commissioned with these one or more actions using portable configurator 120. Preferably portable configurator 120 is a remote control that communicates with devices 105 and system controller 115, which may employ network 110 for these communications, to identify a particular one device $\mathbf{105}_x$ and to issue configuration/set-up/commissioning information appropriate for that particular one device $\mathbf{105}_x$. Details of this are further described herein.

Figure 2:
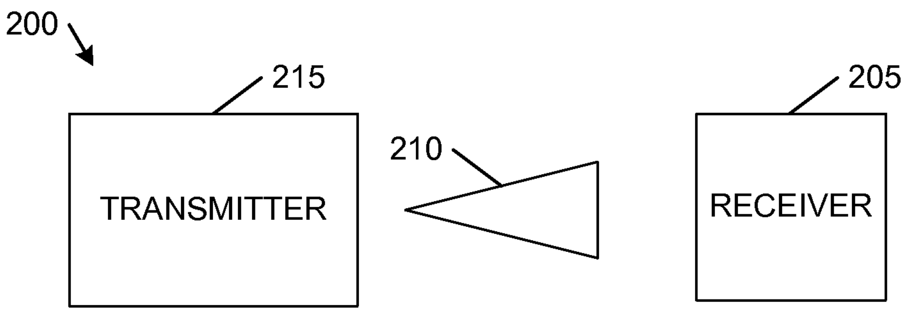
FIG. 2-FIG. 4 illustrate a preferred identification paradigm.
Figure 3:
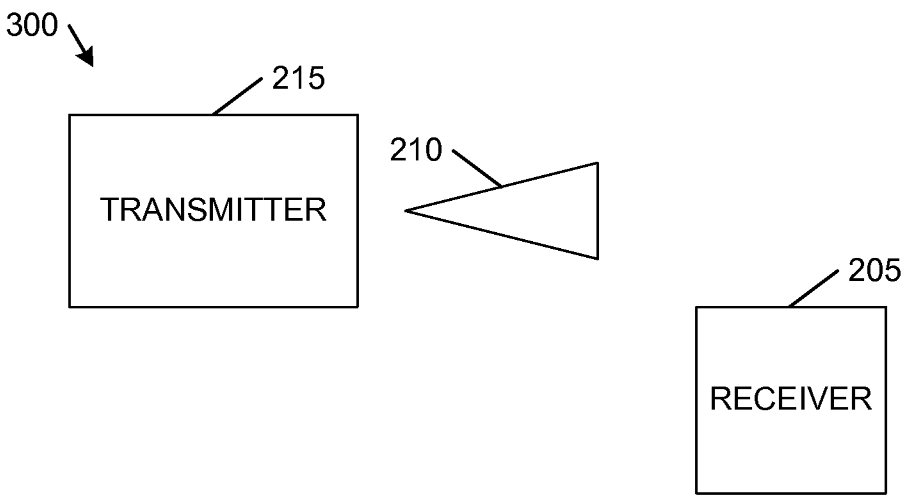
Figure 4:
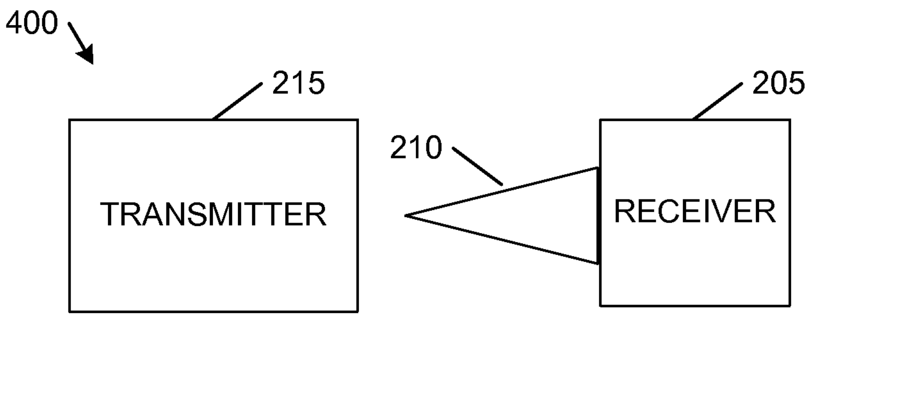

FIG. 2-FIG. 4 illustrate a preferred identification paradigm in which portable configurator 120 is used to remotely disambiguate between several possible nearby devices 105. The remote disambiguation may be performed in many different ways, a preferred way is to transmit a signal from a transmitter to a receiver and derive relative location information. For example, distance and direction information established between portable configurator 120 and each device 105, enables the technician to identify a particular one device $\mathbf{105}_x$ that is closest in a particular direction. There are many different ways of establishing this information, and some installations 100 may have superior modalities for achieving this remote disambiguation. For example, bit error rate (BER) and/or received signal strength indications (RSSI) are ways to determine a distance between a transmitter and a receiver. Directional antennae (or multiple orthogonal antennae or the like) is one way to determine a direction between a transmitter and a receiver. FIG. 2-FIG. 4 illustrate exemplary use of BER/RSSI for distance approximations. Uses of these approximations with a directional element are useful for improved remote disambiguation.

FIG. 2 illustrates a first representative arrangement 200 of a receiver 205 within a radiation pattern 210 of a transmitter 215. First representative arrangement 200 produces acceptable RSSI and BER because receiver 205 is generally fairly disposed within radiation pattern 210.

FIG. 3 illustrates a second representative arrangement 300 of receiver 205 within radiation pattern 210 of transmitter 215. Second representative arrangement 300 produces a relatively lower RSSI and higher BER as compared to first representative arrangement 200 because receiver 205 is generally disposed in fringe areas of radiation pattern 210.

FIG. 4 illustrates a third representative arrangement 400 of receiver 205 within radiation pattern 210 of transmitter 215. Third representative arrangement 400 produces a relatively higher RSSI and lower BER as compared to first representative arrangement 200 because receiver 205 is generally disposed within radiation pattern 210 and closer to transmitter 215.

The preferred embodiments make use of relative values for RSSI and/or BER in determining distances between pairs of receiver 205 and transmitter 215. Depending upon implementation, either receiver 205 or transmitter 215 is disposed in portable configurator 120 and devices 105 incorporate the complementary component. In this way all distances have a common reference (i.e., portable configurator 120) and thus the relative RSSI/BER values indicate a relative distance between portable configurator 120 and each active (i.e., receiving/transmitting) device 105. In large installations 100, a subset of devices 105 may be so remote from any given location of the technician that communications are attenuated to such a degree that there are no relative ranging communications between this subset of devices and portable configurator 120. As the technician moves or relocates through installation 100, the members of the subset change, allowing the technician to identify and commission all devices 105.

As further explained below, in the preferred embodiment there are additional directional elements to further help in identification of a particular one device $105_x$. For example, directional antennae and/or sensors help in further discriminating among different devices 105 and promoting accurate and efficient remote disambiguation for promoting identification of particular one device $105_x$.

Figure 5:
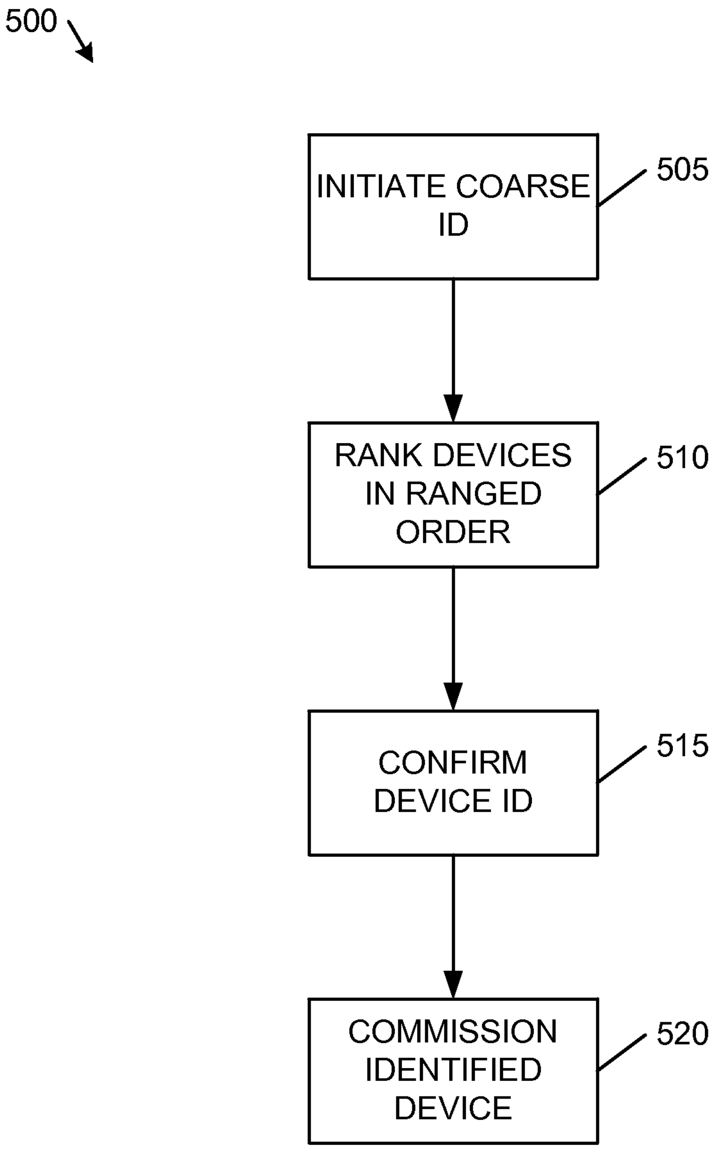
FIG. 5 illustrates an identification and commissioning process.
Figure 6:
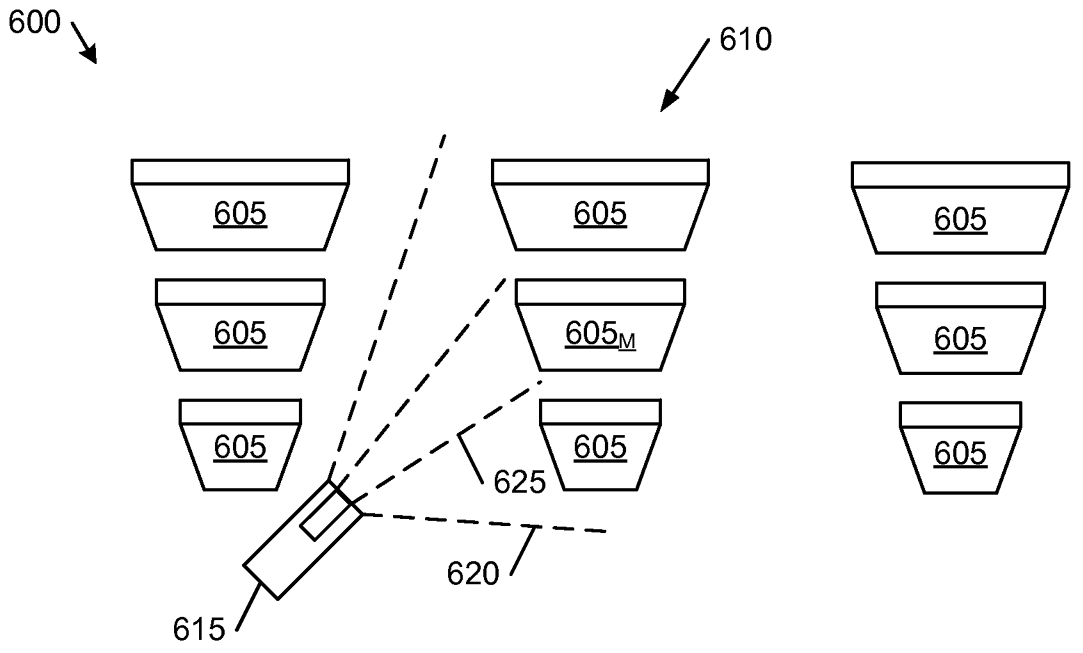
FIG. 6 illustrates a preferred embodiment for a lighting installation.

FIG. 5 illustrates an identification and commissioning process 500 for a particular one device $105_x$ from installation 100 shown in FIG. 1. Process 500 includes a series of four sequential steps for first identifying particular one device $105_x$, and then second to configure/commission the identified particular one device $105_x$. In process 500, portable configurator 120 includes transmitter 215 and each device 105 includes receiver 205. In the most preferred implementation, portable configurator 120 actually transmits two different radiation patterns 210, one radiation pattern 210 from a main antenna and another radiation pattern 210 from a secondary antenna preferably configured in an orthogonal direction. To simplify a discussion of process 500, installation 100 includes three lighting fixtures that are close to each other, portable configurator 120 is disposed within a remote, and the technician desires to identify and commission a "middle" lighting fixture of the three lighting fixtures. The technician positions himself close to the middle lighting fixture and points the remote it its direction. FIG. 6 illustrates a preferred embodiment for this exemplary lighting installation 600. Installation 600 includes a plurality of lighting fixtures 605, which can be ordered into a matrix of rows and columns, a specific row 610 includes the middle lighting fixture $605_M$. The technician operates a remote 615 based upon details of its implementation, some representative implementations described herein. For example, remote 615 may have a disambiguation system that includes a coarse identifier that has a relatively wide "field of view" (or area of effect) 620 and a fine identifier that has a relatively narrower "field of view" (or area of effect) 625. For example, wide field of view 620 may encompass row 610 and narrow field of view 625 may encompass only middle lighting fixture $605_M$. Field of view 620 identifies a subset of plurality of lighting fixtures 605 including middle lighting fixture $605_M$. Field of view 625 in the embodiments described herein identifies a smaller number of this subset (ideally a single lighting fixture but some implementations may provide for more).

Process 500 includes a first step 505 for an initiation of a coarse identification. With first step 505, process 500 issues an identification signal to nearby devices 105 using a first remote disambiguation methodology. In the particular example, the identification signal is sent from remote 615 and includes a pair of transmissions, one from the main antenna and the other from the secondary antenna. Each of the three lighting fixtures receives these transmissions and calculates ranging information to remote 615. In the preferred case, each lighting fixture 605 (e.g., within field of view 620) calculates a BER/RSSI for each of the two transmissions. Middle lighting fixture $605_M$ calculates a BER/RSSI that indicates a closer distance than the other two lighting fixtures (i.e., a lower BER/higher RSSI).

Process 500 next executes second step 510 to rank devices 105 in ranged order. That is, portable configurator 120 arranges the IDs of responding devices 105 according to the distances devices 105 appear to be away from portable configurator 120. One of the devices will appear to be closest, the one having the lowest BER and/or the highest RSSI. In the example, second step 510 identifies middle lighting fixture $605_M$ as the putative closest device.

There are many different ways to develop this ordered list. Embodiments of the present invention enable each device 105 to transmit its calculated ranging (e.g., BER/RSSI) information, along with an associated identifier (e.g., its unique network address), back to portable configurator 120. Portable configurator 120 then creates a table that includes an ID and associated ranging information for the ID. In the example, the ranging information includes a BER for the main antenna and a BER for the secondary antenna. There may be additional data/columns as well, such as an RSSI for the main antenna and an RSSI for the secondary antenna (in addition to or in lieu of the BER), with remote 615 implementing an ordering mechanism to determine which lighting fixture 605 is closest, which is at an intermediate distance, and which is furthest away.

Process 500 includes an optional third step to confirm identification of the closest device. Depending upon the nature of installation 100 and devices 105, it may be necessary or desirable to further disambiguate among the devices in the ordered table. It may be the case that differences between BER/RSSI are not sufficient to positively identify the desired one device $105_x$, or because of physical layout or other attributes of installation 100, two or more devices 105 may be approximately the same distance away from the technician, or the technician may not be able to actually get closest to the particular one device $105_x$.

Third step 515 helps to further disambiguate, or to positively confirm, that the appropriate device has been identified by portable configurator 120. One way to do this is to implement a second remote disambiguation system different in some important aspect from the first remote disambiguation system. In the case of the example, remote 615 is provided with a highly directional light sensor that rejects a signal outside a desired field-of-view (e.g., 10° rejection angle). In this example, third step 515 causes remote 615 to command the lighting fixtures in the ordered list, one fixture at a time starting at the closest device, to actuate its light and turn on. When the narrow beam light sensor on remote 615 detects the light, then the identification is confirmed. The actuation proceeds in order, with the putative closest device actuating first. The efficiency and time to identify the particular one device $105_x$ is greatly reduced over conventional systems. As noted, it is not always possible that the technician will be able to actually get physically closest to the particular one device, or that due to orientation and other aspects of the installation, there may be several likely candidates determined from the first remote disambiguation system. Thus, particular one device $105_x$ may not be top of the list, but it will be close to the top and the technician will not have to wait long for remote 615 to step through the table until confirming the correct device. Many different types of tasks are possible once there is agreement between the technician and a controller as to which specific addressable device the technician has identified for further action. These embodiments provide that agreement simply and efficiently.

It is also not always the case that the confirmation will be automatic. In some cases portable configurator 120 will include a manual confirmation mode (e.g., a button) that the technician operates when the desired one device $105_x$ is actuated. Portable configurator 120 may step through its table, sequentially actuating devices in its list, with each actuated device providing some unique response that is either automatically detected by portable configurator 120 (e.g., the light turning on or other perceptible indication associated with the actuation of the particular device automatically observed) or a response that is detected by the technician who manually enters that information into portable configurator 120 (e.g., some perceptible indicator associated with the device that is noted by the technician who operates the manual confirmation mode in response).

Process 500 may then execute an optional fourth step 520 of commissioning the identified device. In some implementations, process 500 may be simply an identification process in which case first step 505 and second step 510 are executed, and third step 515 in appropriate situations. When process 500 further includes the commissioning function, fourth step 520 is executed as well to send information to system controller 115 to configure the identified device. For example, this information may include what the user wants system controller 115 to do with the identified device—such as dim the identified device to 50% when a particular event occurs.

It should be noted that process 500 may be adapted so that portable configurator 120 includes the receiver and devices 105 include the transmitter. In such a case, remote 615 initiates transmissions from devices 105 and remote 615 determines, for each received transmission, an ID and an associated ranging value for each antenna.

Figure 7:
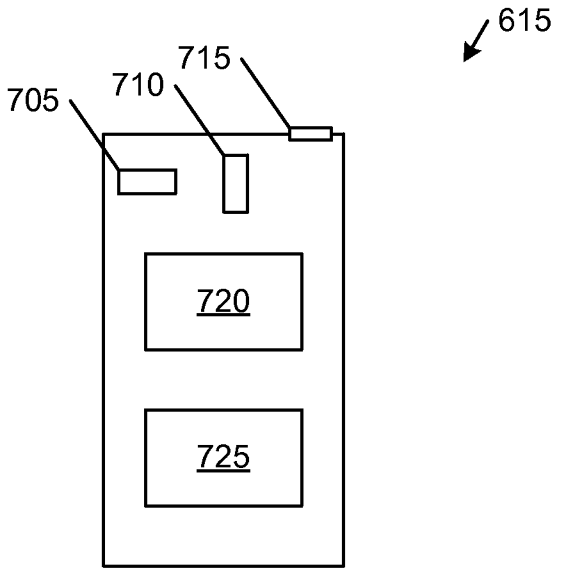
FIG. 7 illustrates a particular arrangement for a portable configurator.

FIG. 7 illustrates a particular arrangement for remote 615 shown in FIG. 6. Remote 615 includes a main antenna 705, a secondary antenna 710, a narrow beam light sensor 715, a controller 720, and a I/O system 725. Controller 720 includes a microprocessor and memory storing commands to operate remote 615 as described herein, in response to input from I/O system 725. A portion of the memory stores the table holding the range ordered candidate devices. Table I below is an example of such a table.

TABLE I

Ordered Range List

| ID | BER (Main) | BER (Secondary) |
|---|---|---|
| Device_A | 2% | 75% |
| Device_B | 2% | 45% |
| . . . | | |
| Device_N | 75% | 75% |

Table_I lists devices 105 in order from most likely to least likely, based upon BER from main antenna 705 and secondary antenna 710. Ideally the particular one device 105$_x$ being directly pointed at has a BER of ~0% for main antenna 705 and a much higher BER for secondary antenna 710. During third step 515, remote 615 sends out a control signal to the device on the top of the list (i.e., Device_A in Table_I) to dim down and then go back to 100%. The light intensity response of Device_A is gauged by sensor 715 to confirm that Device_A corresponds to middle lighting fixture 605, for example. As noted herein, the system and process are most preferably implemented in a lighting installation controlled by lighting control system.

The system and methods above has been described in general terms as an aid to understanding details of preferred embodiments of the present invention. In the description herein, numerous specific details are provided, such as examples of components and/or methods, to provide a thorough understanding of embodiments of the present invention. It is anticipated that many implementations of the present invention include configurator 120 as a portable device, such as incorporated into a hand-held electronic device such as a remote control and the like. In some implementations, the configurator may be a stationary device and considered a fixture or the like at a relatively permanent stationary location. In some implementations, sometimes it is the case during some set-up and configuration tasks that remote configurator 120 is not completely communicative with network 110 or system controller 115. Some features and benefits of the present invention are realized in such modes and are not required in every case.

Other implementations are possible for other arrays/matrices/aggregations of addressable and remotely controllable devices in addition to the lighting example. For example, some indoor climate control systems include a plurality of remotely controllable dampers. The present invention may be implemented to commission individual dampers in a similar fashion. A confirmatory secondary disambiguation may employ closing/opening of the damper/duct, audio detection of air flow, thermal sensing of airflow relative to the damper/duct, and/or other associated unique attribute.

Some embodiments include additional primary disambiguation structures in addition to, or in lieu of, a distance-dependent signal. For example, there are direction-dependent signals and other location-dependent (relative to configurator and/or absolute location measured from a known position that typically is fixed).

One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method for identifying a particular one network lighting device from a network including a plurality of network lighting devices, each network lighting device including a unique associated network ID used in addressing the network lighting device over the network, comprising:

a) exchanging wirelessly a plurality of disambiguation data between a portable configurator and a set of network lighting devices from the plurality of network lighting devices in communication range of said portable configurator, said set of network lighting devices including the particular one network lighting device; and b) determining automatically using said portable configurator a map of said set of network lighting devices, said map identifying, for each particular network lighting device of said set of network lighting devices, both (i) a distance between said particular network lighting device and said portable configurator and (ii) said unique associated network ID with said particular network lighting device;

wherein said exchanging step a) includes transmitting said plurality of disambiguation data using wireless radiofrequency communications.

2. The method of claim 1 further comprising:

c) addressing individually and sequentially one or more network lighting devices in a subset of said set of network lighting devices using said map to select candidate network IDs until said unique associated network ID of the particular one network lighting device is used to address the particular one network lighting device.

3. The method of claim 1 wherein said exchanging step a) includes a1) transmitting a signal between said portable configurator and each network lighting device of said set of network lighting devices; a2) establishing a range-dependent parameter for each said transmitted signal responsive to a distance between said portable configurator and said particular network lighting device participating in said transmitting step a1) with respect to each said signal; and a3) matching said unique associated network ID of said network lighting device and said established range-dependent parameter.

4. The method of claim 3 wherein said determining step b) includes ranking said set of network lighting devices in a rank order responsive to said range-dependent parameters.

5. The method of claim 2 wherein said addressing step c) selects a sequence of candidate network IDs responsive to said rank order, further comprising:

d) responding to each particular candidate network ID of said sequence by a specific one network lighting device of said set that includes said unique associated network ID matching said particular candidate network ID; and e) interrupting said addressing step c) when the particular one network lighting device responds to said particular candidate network ID.

6. The method of claim 5 wherein said portable configurator includes a light sensor, wherein said responding step d) includes d1) actuating said specific one network lighting device to generate a light signal, and wherein said interrupting step e) includes e1) detecting said light signal using said light sensor.

7. An apparatus, comprising:

a network having a plurality of network lighting devices, each particular network lighting device including a processor, a memory storing program instructions executable by said processor, a network interface coupled to one or more other network interfaces of other network lighting devices, and a network ID, said stored network ID associated with said particular network lighting device and configured to uniquely address said particular network lighting device over said network, and each particular network lighting device further including a wireless radiofrequency communicator coupled to said processor;

a network controller communicated to said plurality of network lighting devices using said network, said network controller issuing a command to a particular one network lighting device using said network ID associated with said particular one network lighting device; and a portable configurator including a stored program processor, a memory storing non-transitory program instructions for said stored program processor, and a wireless radiofrequency configurator communication device in communication with said wireless radiofrequency communicators of a set of network lighting devices of said plurality of network lighting devices including said particular one network lighting device, each said network lighting device of said set of network lighting devices having a relative physical location with respect to said portable configurator, said portable configurator, responsive to execution of said non-transitory program instructions by said stored program processor, exchanges a first plurality of wireless radiofrequency disambiguation data with said set of network lighting devices and establishes a physical location map that associates each particular network lighting device of said set of network lighting devices with both (i) a relative physical location of said particular network lighting device and (ii) said associated network ID of said particular network lighting device.

8. The apparatus of claim 7 wherein said portable configurator, responsive to execution of said non-transitory program instructions by said stored program processor, exchanges a second plurality of wireless radiofrequency disambiguation data with said set of network lighting devices confirming said particular one network lighting device has been identified by said portable configurator.

9. The apparatus of claim 8 wherein said portable configurator includes a light sensor, wherein said confirming includes generating individually a light signal from said plurality of network lighting devices until said particular one lighting device generates said light signal detected by said light sensor.

10. A method for identifying a particular one network lighting device from a network including a plurality of network lighting devices, each network lighting device including a unique associated network ID used in addressing the network lighting device over the network, comprising:

a) initiating a coarse identification process for the particular one network lighting device using a portable configurator that exchanges a first set of disambiguation data with a set of the plurality of network lighting devices, said set including the particular one network lighting device; and thereafter b) processing automatically said first set of disambiguation data to create a map of said set of network lighting devices, said map identifying, for each particular network lighting device of said set of network lighting devices, both (i) a distance between said portable configurator and said particular network lighting device and (ii) said unique associated network ID of said particular network lighting device;

wherein said first set of disambiguation data is exchanged using wireless radiofrequency communications.

11. The method of claim 10 further comprising:

c) initiating a confirm identification process for the particular one network lighting device using said portable configurator that exchanges a second set of disambiguation data with said set of the plurality of network lighting devices; and thereafter d) processing automatically said second set of disambiguation data to confirm an identification of the particular one network lighting device.

12. The method of claim 11 wherein said portable configurator includes a light sensor, wherein said second set of disambiguation data includes selective generation of a light signal from an individually addressed network lighting device from said set, wherein said initiating step c) includes individually generating said light signal from each of the network lighting devices using said map, and wherein said processing step d) confirms said identification when the particular one network lighting device generates said light signal and is detected by said light sensor.

13. A method for identifying a particular one addressable network device from a network including a plurality of addressable network devices, each addressable network device including a unique associated network ID used in addressing the addressable network device over the network, comprising:

a) exchanging wirelessly a plurality of disambiguation data between a portable configurator and a set of addressable network devices from the plurality of addressable network devices in communication range of said portable configurator, said set of addressable network devices including the particular one addressable network device; and b) determining automatically using said portable configurator a map of said set of addressable network devices, said map identifying, for each particular addressable network device of said set of addressable network devices, both (i) a distance between said portable configurator and said particular addressable network device and (ii) said unique associated network ID of said particular addressable network device;

wherein said exchanging step a) includes transmitting said plurality of disambiguation data using wireless radiofrequency communications.

14. The method of claim 13 further comprising:

c) addressing individually and sequentially one or more addressable network devices in a subset of said set of network devices using said map to select candidate network IDs until said unique associated network ID of the particular one addressable network device is used to address the particular one addressable network device.

15. The method of claim 13 wherein said exchanging step a) includes a1) transmitting a signal between said portable configurator and each addressable network device of said set of addressable network devices; a2) establishing a range-dependent parameter for each said transmitted signal responsive to a distance between said portable configurator and said particular network lighting device participating in said transmitting step a1) with respect to each said signal; and a3) matching said unique associated network ID of said addressable network device and said established range-dependent parameter.

16. The method of claim 15 wherein the particular one addressable network device includes a particular one addressable remotely controllable damper from a plurality of remotely controllable dampers of a climate control system.

17. An apparatus, comprising:

a network having a plurality of addressable network devices, each particular addressable network device including a processor, a memory storing program instructions executable by said processor, a network interface coupled to one or more other network interfaces of other addressable network devices, and a network ID, said stored network ID associated with said particular addressable network device and configured to uniquely address said particular addressable network device over said network, and each particular addressable network device further including a wireless radiofrequency communicator coupled to said processor;

a network controller communicated to said plurality of addressable network devices using said network, said network controller issuing a command to a particular one addressable network device using said network ID associated with said particular one addressable network device; and a portable configurator including a stored program processor, a memory storing non-transitory program instructions for said stored program processor, and a wireless radiofrequency configurator communication device in communication with said wireless radiofrequency communicators of a set of addressable network devices of said plurality of addressable network devices including said particular one addressable network device, each said addressable network device of said set of addressable network devices having a relative physical location with respect to said portable configurator, said portable configurator, responsive to execution of said non-transitory program instructions by said stored program processor, exchanges a first plurality of wireless radiofrequency disambiguation data with said set of addressable network devices and establishes a physical location map that associates each particular addressable network device of said set of addressable network devices with both (i) a relative physical location and (ii) said associated network ID of said particular addressable network device.

18. The apparatus of claim 17 wherein said particular one addressable network device includes a particular one addressable remotely controllable damper from a plurality of remotely controllable dampers of a climate control system.

19. A portable configurator operable to provision a particular one network device from a network including a plurality of network devices, each network device including a unique associated network ID used in addressing the network device over the network, comprising:

a housing supporting a main antenna, a secondary antenna, a controller, and an input/output (I/O) system, said controller including a microprocessor and a memory storing a set of microprocessor-executable instructions, said set of microprocessor-executable instructions controlling said antennae with an identification and commissioning method, said identification and commissioning method comprising the steps of:

a) initiating a coarse identification process relative to the particular one network device by exchanging a first set of disambiguation data with a set of the plurality of network devices using a disambiguating radiofrequency transmission from each of said antennae, said set of the plurality of network devices including the particular one network lighting device; and thereafter b) processing automatically said first set of disambiguation data to create a map of said set of network devices, said map identifying, for each particular network device of said set of network lighting devices, both (i) a distance from said antennae to said particular network device and (ii) said unique associated network ID of said particular network device.

20. The portable configurator of claim 19 further comprising:

c) initiating a confirm identification process for the particular one network device an alternate communication system different from said disambiguation radiofrequency transmission that exchanges a second set of disambiguation data with said set of the plurality of network devices; and thereafter d) processing automatically said second set of disambiguation data to confirm an identification of the particular one network device.

21. The portable configurator of claim 20 wherein said housing further supports a sensor, controlled by said set of microprocessor-executable instructions, responsive to a confirmation signal from the particular one network device, wherein said second set of disambiguation data includes selective generation of said confirmation signal from an individually addressed network lighting device from said set of the plurality of network devices, wherein said initiating step c) includes individually generating said confirmation signal from each of the network devices using said map, and wherein said processing step d) confirms said identification when the particular one network lighting device generates said confirmation signal and is detected by said sensor.

22. The portable configurator of claim 21 wherein said set of the plurality of network devices include lighting devices, said sensor includes a light sensor, and generation of said confirmation signal includes illumination of a lighting device responsive to being individually and specifically addressed during said initiating step c).

* * * * *